July 11, 1933.　　　　F. D. RHODES　　　　1,917,600
TRANSMISSION LINE
Filed Feb. 26, 1931
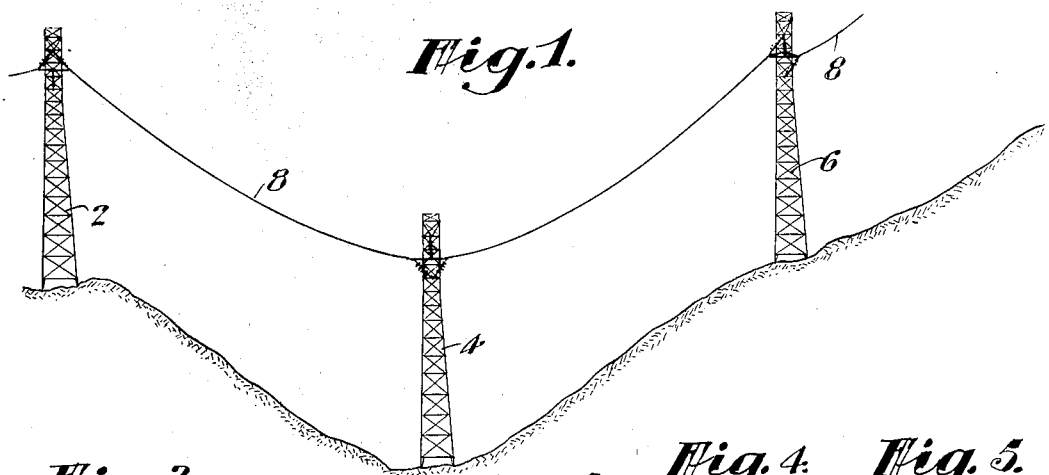
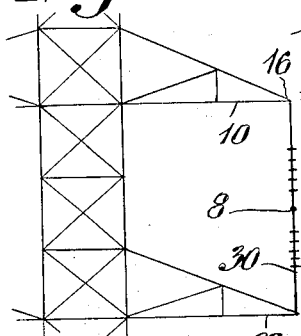
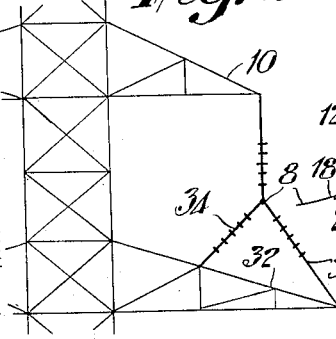
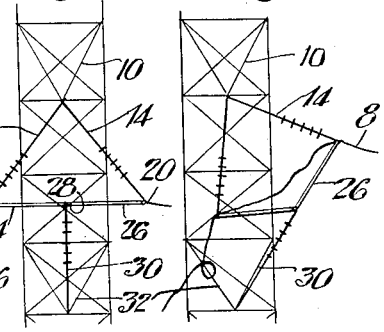
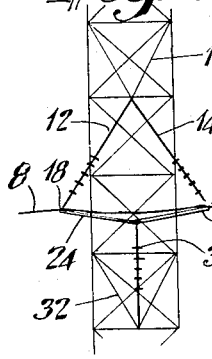
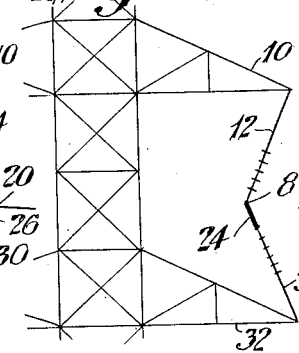
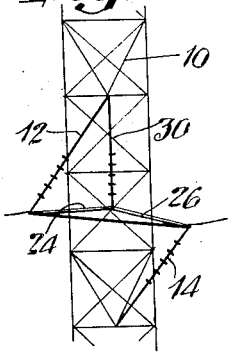
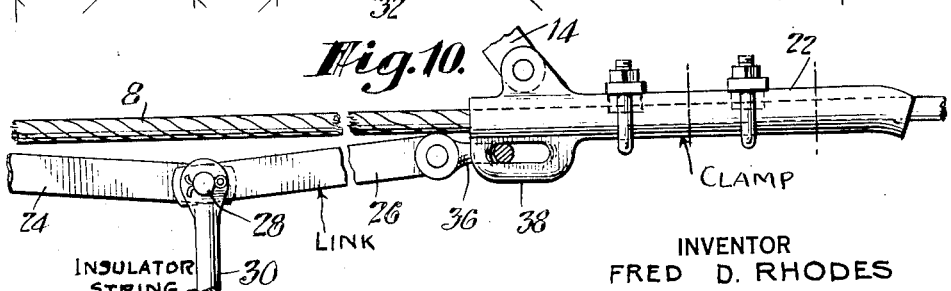
INVENTOR
FRED D. RHODES
BY
Arnold R. Workman
his ATTORNEY Patented July 11, 1933

1,917,600

UNITED STATES PATENT OFFICE

FRED D. RHODES, OF NEW YORK, N. Y.

TRANSMISSION LINE

Application filed February 26, 1931. Serial No. 518,390.

This invention relates to improvements in electrical transmission or other transmission lines and more particularly to a stabilizer apparatus used in connection with the means for supporting the transmission cable on the towers or poles of such transmission lines.

In constructing electrical and other transmission lines it is the common and generally necessary practice to use at various points in the line, such as at turns and at low points where the ratio of downward vertical load to transverse load may be small, "dead-end" strings to support the cables in order to prevent short circuits resulting from an electrically-charged cable being swung near to the supporting structure by wind or other transverse force. Where "dead-end" strings are used it is commonly necessary to use a supporting structure, commonly known as a "dead-end structure" or tower capable of resisting the combined longitudinal pull, in either longitudinal directions, of all the cables, together with the vertical and transverse "loads" or forces produced by gravity, wind or the like acting on the cables. "Dead-end" structures and their foundations must necessarily be constructed much heavier and stronger than "suspension structures" and their foundations which are commonly constructed to sustain the vertical and transverse loads and no part, or at most a small part, of the longitudinal pull. "Dead-end" construction is therefore much more expensive than "suspension" construction.

In most transmission lines it has been found desirable in most cases to use one "dead-end" structure per mile for the purpose of "anchorage"; but in rough or uneven country several of these "expensive dead-end" structures per mile may be necessary in order to prevent "short-circuiting" of an electrically-charged cable.

The primary object of the present invention is therefore to provide a cable-supporting apparatus of comparatively simple and inexpensive construction, the use of which will eliminate to a large extent the necessity for "dead-end" structures in transmission lines, and which will in safety permit, instead, the use of suspension structures.

A further object of the invention is to provide a resilient stabilizing apparatus for electrical transmission lines adapted to relieve the line of undue strain and shocks and materially reduce the cost of constructing such lines.

With these objects in view the invention comprises an apparatus for attaching to and supporting a transmission cable on a transmission line, tower, pole or other supporting structure, said apparatus comprising a resilient toggle means adapted to utilize the longitudinal tension in the transmission cable for maintaining or helping to maintain the cable within a relatively fixed field of movement with respect to the tower. Longitudinal tension in the cable is converted into a stabilizing agent.

The invention will be more fully understood from the following detailed description taken in connection with the accompanying diagrammatic drawing in which:

Fig. 1 is a general view showing a section of transmission line in which "towers" are employed as the supporting structures.

Fig. 2 is a broken side view of a portion of the top of a transmission tower looking in the direction of the transmission line and showing certain features of the invention.

Fig. 3 is a view similar to Fig. 2 showing a modification of the invention.

Fig. 4 is a view of the stabilizer apparatus shown in Fig. 2 looking from the right.

Fig. 5 is a view similar to Fig. 4 showing the operation of the apparatus of the present invention at a time when a transmission cable has broken.

Fig. 6 is a view similar to Fig. 4 showing the effect of the wind blowing against the cable and the action of the stabilizer apparatus.

Fig. 7 is a view similar to Fig. 2 and showing the effect of wind as in Fig. 6.

Fig. 8 is a view similar to Fig. 6 except that the parts are inverted.

Fig. 9 is a view similar to Figs. 6 and 8 showing a partial inversion of the stabilizing apparatus.

Fig. 10 is a detailed view showing one method of attaching the stabilizer to the transmission cable.

Referring to the apparatus shown in Fig. 1 of the drawing, this figure illustrates a general view of a transmission line comprising a series of towers 2, 4 and 6 on which is suspended a cable 8. The towers are represented as being provided with the stabilizing apparatus comprising the features of the present invention. In the ordinary construction of a transmission line such as that shown, the tower 2 at the edge of a substantial depression might of necessity be built stronger than an ordinary tower carrying cables over a level country. Tower 4, built in accordance with the ordinary structural methods would of necessity be constructed as a "dead-end" tower in order to prevent the upswing of the cables against the tower or arms thereof. Likewise the tower 6 may need to be of "dead-end" construction in order to take care of the upgrade strain of the cable and the directional pull of the cable to the right.

In constructing the above-mentioned transmission line in accordance with the features of the present invention, the tower 2 may be equipped with the insulator strings and stabilizing apparatus as shown in Figs. 2, 3 and 4.

As shown in Figs. 2 and 4, the cable 8 is suspended from a tower arm 10 by means of two insulator strings 12 and 14, attached to the arm at 16 and to the cable respectively at points 18 and 20. In the practice of the invention the insulator strings 12 and 14 will be sufficiently long so that the points 18 and 20 will be a substantial distance apart. In some cases this distance may be from 6 to 8 feet. The insulator strings 12 and 14 are firmly attached to the cable 8 by any clamping device such for example as clamp 22 shown in Fig. 10.

In order to prevent swinging of the cable against the tower or the arm 10 a stabilizer apparatus is provided which includes a pair of links 24 and 26 loosely attached by any convenient means to the clamps 22 and connected together at a point 28 and to an insulator string 30, which in turn is attached to a lower arm 32. Fig. 10 shows a broken construction of parts of this stabilizer apparatus in enlarged view in which the links 24 and 26 are represented as metal straps or plates. The links 24 and 26 however may be constructed of ordinary wire cable, chain, or other form of connector but should be under normal conditions substantially the same total length as the distance between the points 18 and 20 on the cable. Fig. 3 shows a modification of Fig. 2 in which the center point of the links 24 and 26 is connected by means of two insulator strings 34 and 36 to the lower tower arm 32. This construction tends to keep the cable in a more limited position than the single lower string shown in Fig. 2, and may be used effectively at a point in the line where the turn is large.

Fig. 5 shows the effectiveness of the stabilizer construction in easing the strain placed on a tower in the event a cable is broken on one side. In this figure the cable being broken on the left the tension of the cable on the right is taken up jointly by the insulator string 14 and the link 26 and insulator string 30, so that the load is distributed on both of the cross arms 10 and 32. It will be noted furthermore from the angular position of the insulator string 14 and insulator string 30 and link 26 with respect to the direction of pull of the cable 8 that the longitudinal strain on the tower arms is much less than in the case where a single upper insulator string is used as in ordinary practice.

In Figs. 6 and 7 the effectiveness of the stabilizer apparatus is shown in taking up the swinging strain caused by wind blowing from the right. As the wind blows the cable toward the tower in Fig. 6 the pull on the insulator string 30 at the connecting point of links 24 and 26 tends to utilize the longitudinal strain on the cable 8 as a means to hold the cable away from the tower. Furthermore the particular arrangement of the links and their connection at two separated points on the cable provides a resilient checking means which eliminates any abrupt shocks to the tower. The greater the wind force against the cable 8 in Fig. 6, the greater the strain taken by the links 24 and 26. In severe cases this strain may entirely relieve that section of cable between points 18 and 20.

Fig. 8 shows a modification of the invention in which the insulator strings and stabilizer apparatus are inverted with respect to the showing in Fig. 6. This construction may be used on a tower such as tower 4 (Fig. 1) where there may be an uplift in the cable.

Fig. 9 shows a modified construction which might be used in connection with a tower having the position of tower 6 (Fig. 1), where on one side the cable strain is downward and the other side the cable has an uplift tendency.

As shown in Fig. 10 the links 24 and 26 are preferably attached to the clamps 22 by means of a jointed link construction such as 36 and 38 to provide for a twisting or swivelling motion without placing a twisting strain on the cable or clamps. This twisting motion would be apparent where the apparatus takes a position such as that shown in Fig. 7 in which there is an angle between the links and the upper insulator strings.

The use of the stabilizing apparatus in accordance with the present invention is particularly important for eliminating the cost of "dead end" towers in uneven country and at angles or "turns" in the transmission line up to about 30°. With the present construction an angle of at least 30° may be made in the line without materially increasing the cost of the tower and at the same time the cables will be maintained by the stabilizing apparatus in a relatively limited field of movement. This jointed stabilizer construction minimizes the effect on the tower resulting from a sudden gust of wind or the breaking of a cable.

In Fig. 1 of the drawing only a single cable has been shown for convenience, but it is within the scope of the invention to carry any number of cables on the transmission towers. In Figs. 2 to 9 broken diagrammatic sections only of the upper portion of the towers are shown. Each tower may comprise as many arms as desired. Instead of attaching the mid-portion of the flexible link arrangement to a lower arm on the tower in some cases it may be attached to the tower proper.

The construction of the present invention is highly adapted for use in connection with any type of transmission line and provides a stabilizing means whereby the cost of erecting transmission towers may be held to a minimum and at the same time secure the benefits of heavy construction. Furthermore the stabilizing apparatus provides a shock absorbing means for the cables and prevents the swinging of the cable against the tower or arm. The stabilizing means by its toggle action tends to utilize the tension in a cable and thereby minimize and check any swing, strain, or longitudinal wave imposed thereon.

Having thus described the invention in its preferred form what is claimed as new is:

1. A suspension means for supporting an electrical transmission cable on a structure having spaced arms, comprising a pair of insulator strings attached to one arm of said structure and clamped to said cable in spaced relation to each other, a stabilizer for said cable comprising a pair of links one end of each being attached respectively to said cable at the places of attachment of said strings, and an insulator string connecting the other ends of said links with a second arm on said structure, said stabilizer being adapted to limit the swing of said cable in a relatively limited field with respect to said structure.

2. A suspension means for supporting a transmission cable on a tower having upper and lower arms, a pair of insulator strings attached to the upper arm and to said cable for supporting the weight of the same, the points of attachment of said strings to the cable being a substantial distance apart on the cable, a link attached by one end to said cable at each point of attachment of said strings, and an insulator string attached to the other ends of said links and to the lower tower arm.

3. A suspension means for supporting a transmission cable, comprising a tower having upper and lower arms, means for securing said cable to one of said arms, a flexible means attached to said cable at two points and to the other of said tower arms, said means being adapted to convert any longitudinal stresses in said cable into a stress tending to limit the field of swing of said cable.

4. A suspension means for supporting a transmission cable, comprising a transmission tower having upper and lower arms, an insulator string attached to the upper arm and to said cable, an insulator string attached to the lower arm and to said cable at a point a substantial distance from the point of attachment of the first mentioned string, a flexible connector substantially parallel to said cable and attached thereto at substantially the points of attachment of said strings, and an insulator string attached to the mid-portion of said connector and to one of said arms.

5. In a transmission line in which a transmission cable is supported on the arm of a tower structure by a pair of supporting elements attached to said arm and to said cable in such a way as to form a triangle with the cable as its base, the improvement which comprises a flexible link member attached to the cable at substantially the points of attachment of said elements, and means connecting the mid-portion of said member to said tower, to thereby prevent the swinging of said cable against said tower.

6. A suspension means for supporting a transmission cable comprising, a supporting structure and means attaching said cable at one point thereon, a stabilizer for maintaining the cable in a limited field of movement with respect to said structure, said stabilizer comprising a pair of pivotally connected links, each attached to said cable at a point thereof spaced from the point of attachment of the other link, and means attaching both said links to said structure at a point thereon spaced from the first-named point of attachment of the cable thereto.

7. In a transmission line construction in which a transmission line cable is attached to one point of a supporting structure by a pair of elements which are attached to said cable at separate points a substantial distance apart, the improvement which comprises a stabilizing device attached to said cable at substantially the points of attachment of said elements and to a second point of said structure, said device being adapted to ease the force of adverse stresses applied by said cable and to maintain said cable in a relatively limited field of movement with respect to said structure.

8. A suspension means for a transmission line as defined by claim 2 in which said links are loosely hinged to said cable.

9. A suspension means for supporting a transmission cable on a tower structure including a means for attaching said cable to said tower, a stabilizer for limiting the field of movement of said cable with respect to the said tower comprising a pair of pivotally connected links each attached to the cable at a point a substantial distance from the point of attachment of the other, and means for attaching each of the links to the tower.

In testimony whereof I affix my signature.

FRED D. RHODES.